May 5, 1931. F. W. JAEGER 1,803,708

TEMPERATURE CONTROL DEVICE

Filed May 1, 1929

Inventor
Frederich W. Jaeger
By
Quarles & French
Attorneys

Patented May 5, 1931

1,803,708

UNITED STATES PATENT OFFICE

FREDERICK W. JAEGER, OF MILWAUKEE, WISCONSIN

TEMPERATURE CONTROL DEVICE

Application filed May 1, 1929. Serial No. 359,597.

The invention relates to thermostatically-controlled valves and more particularly to the type used on individual radiators for controlling the temperature of the rooms in which such radiators are located.

Devices of the type above described should be of compact construction, capable of ready adjustment and provided with a manual shut-off control. One of the objects of the present invention is to provide a novel arrangement of thermosensitive element and shut-off mechanism for the valve.

A further object of the invention is to provide a novel arrangement of adjustment for controlling the temperature necessary to effect the closing of the valve through the adjustment of a tension spring tending to open the valve.

A further object of the invention is to provide a simple and efficient arrangement of the various elements making up the device, whereby it may be readily assembled or its parts disconnected in case repairs are necessary.

The invention further consists in the several features hereinafter set forth and more particularly defined by claims at the conclusion hereof.

In the drawings Fig. 1 is a vertical sectional view taken on the line 1—1 of Fig. 2;

Figure 1:
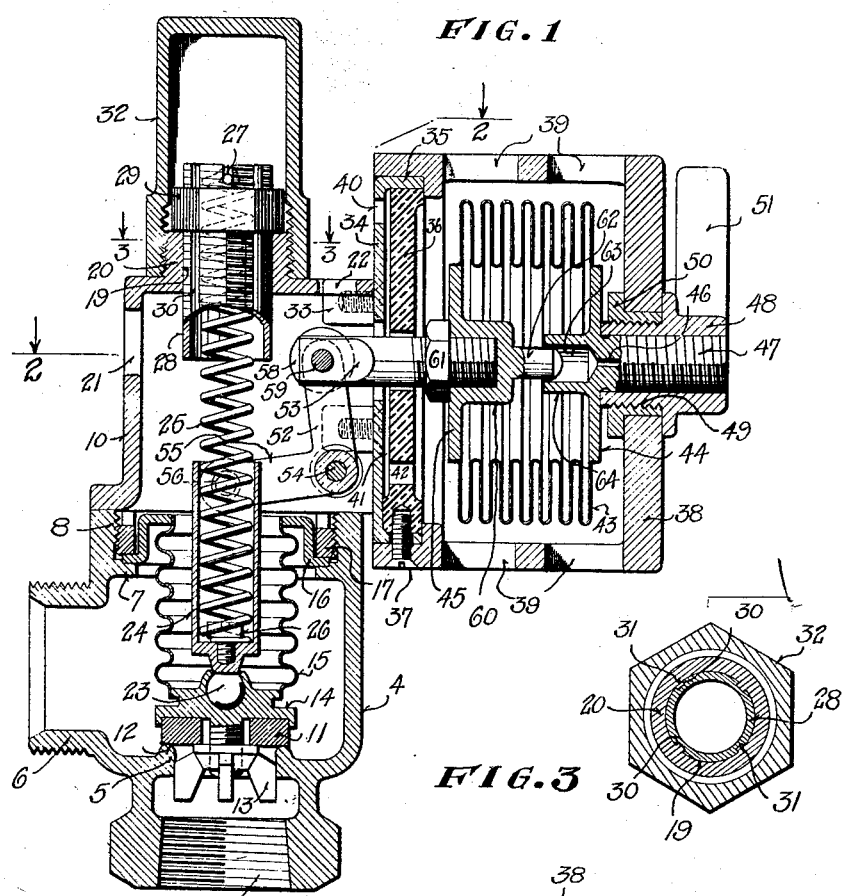

In the drawings the numeral 4 designates a valve casing having a threaded opening 4′ at one end for connection with the heating fluid supply pipe of the radiator, a valve-controlled passage 5, a threaded side opening 6 for connection by the usual union connection with the inlet to the radiator, an opening facing the opening 4′ having an inwardly extending flange portion 7, a threaded bore 8 and suitable apertured bosses, not shown, registering with companion bosses 9 on a casing member 10.

A packless valve comprises a valve disk 11 seating on the seat 12 and clamped between a nut 13, slidably guided in the opening 5, and a head member 14 which is connected in a fluid-tight manner with one end of a multiple bellows diaphragm 15 whose other end is connected in a fluid-tight manner with a flanged ring 16 clamped in a fluid-tight manner against the flange 7 by a spanner-operated sleeve-nut 17 engaging the threaded bore 8.

The casing member 10 is connected to the top of said valve casing by screws 18 passing through the bosses 9 and corresponding threaded bosses in said valve casing and is open at its bottom and one side and has an opening 19 in a threaded extension 20 of its top and ventilating openings 21 and 22.

Figure 3:
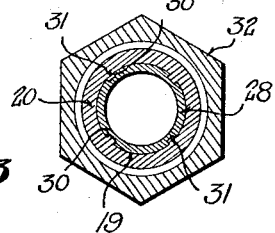
Fig. 3 is a cross sectional view on the line 3—3 of Fig. 1.
Figure 2:
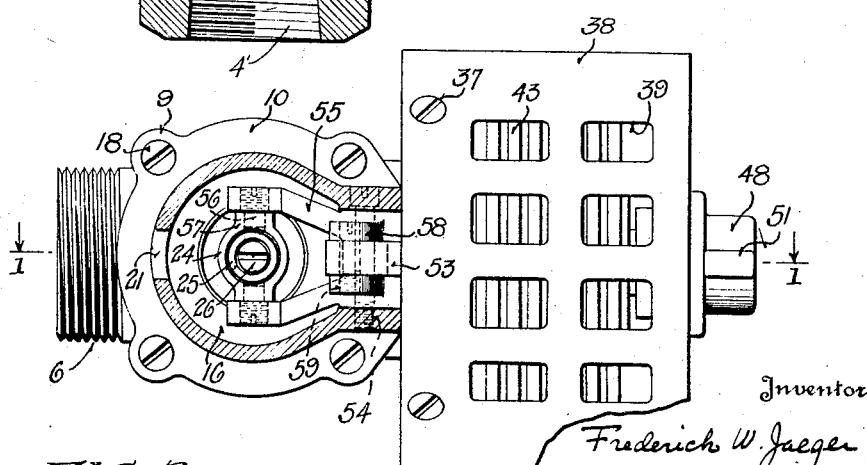
Fig. 2 is a partial section and partial plan view taken on the line 2—2 of Fig. 1.

The head 14 of the valve has a ball and socket joint connection 23 with a tubular stem 24 and is normally held open by a tension spring 25 connected at one end by screw 26 with the stem 24 and at its other end by a pin 27 with a threaded sleeve 28 slidably mounted and guided in the opening 19 and engaged by a tension-adjusting nut 29, said sleeve being prevented from rotating relative to the extension 20 by providing radially disposed grooves 30 in said sleeve in which radially disposed ribs 31 in said extension fit, as more particularly shown in Fig. 3. A cap 32 engaging the threaded portion of the extension 20 covers the nut 29 and prevents tampering therewith.

Secured to the side opening of the casing 10, by screws 33, is a metal plate 34 having a flanged ring portion 35 to which a heat shield 36 of suitable heat-insulating material is suitably secured by screws 37, which also pass through and secure to said plate a cylindrical casing member 38 of a molded composition heat-insulating material provided with top and bottom ventilating openings 39. The plate 34 has a ventilating opening 40 and the shield 36 is spaced from the main body of the plate by the space 41 and has a ventilating opening 42 whereby some of the air entering the bottom openings 39 passes through opening 42 up through the space 41 and out through the opening 40.

A thermosensitive element comprising a chamber formed by an expansible and contractible bellows 43, connected in a fluid-tight manner with end plates 44 and 45 and charged in known manner, through a subsequently sealed inlet 46, with a suitable heat-sensitive liquid, is mounted in the casing 38. For this purpose the end plate 44, has a threaded rod extension 47 on which is mounted a sleeve-nut 48 which has a threaded exterior portion 49 engaging in a threaded bore of a flanged tube 50 that is free to turn in the casing, said nut 48 having a laterally extending handle 51 formed thereon for turning the same.

Motion from the thermosensitive element is transmitted to the valve by a bell-crank lever 52 and rod 53 working through openings in the plate and shield, respectively.

The lever 52 is pivotally mounted on a pin or screw 54 in the casing 10 and has a forked end 55 whose bifurcations are pivotally connected by screw pivot pins 56 to bosses 57 on the upper end of the stem 24 and a forked end 58 connected by a screw pivot pin 59 with the flattened end of the rod 53 which is preferably of a suitable heat-insulating material.

The other end of the rod 53 is threaded to engage in a threaded boss 60 of the end plate 45 to which it is locked by a locknut 61 and this boss has a pin extension 62 working loosely in a bore 63 in a tubular extension 64 of the plate 44 under all automatic conditions of operation of the valve.

With this construction the tension of the spring 25 is initially set by the adjustment of the nut 29 so as to keep the valve open and exert an opposing tension upon the action of the expansion of the thermosensitive element acting through the lever 52 and tending to close the valve, the valve closing, when a predetermined temperature of the air in the room has been reached, by the movement of rod 53 under the action of the expanding bellows 43 and the consequent swinging movement of the lever 53 acting on the valve stem 24 to close off the valve and thus prevent the further passage of heating fluid to the radiator. When the air in the room again cools off the bellows contracts and the spring 25 then acts to open the valve an amount permitted by said thermosensitive element. If now it is desired to shut off the supply of heating fluid, the operator turns the sleeve 48 so as to move the same outwardly relative to the casing 38, thereby causing the pin 47 to move inwardly, and consequently the end plate 44, until the pin 62 strikes the inner end of the bore 63 and then both end plates 44 and 45 are moved as a unit toward the left to swing the lever downwardly and act on the stem 24 to close the valve. Furthermore, the amount of lift of the valve by the opening movement of the spring 25 is controlled by the adjustment of the end plate 44 relative to the end plate 45 under the control of the operator, since moving the plate 44 inwardly causes the distance between the pin 62 and end of the bore 63 to become shorter and thus limit the upward swinging movement of the lever 52.

Small regulations in temperature adjustment may also be effected by this movement of the end plates, since an inward movement of the plate 44 puts the bellows under a slight tension, which is reflected in the operation of the valve.

I desire it to be understood that this invention is not to be limited to any particular form or arrangement of parts except insofar as such limitations are included in the claims.

What I claim as my invention is:

1. In valve mechanism of the type described, the combination of a valve casing, a valve in said casing controlling the supply of heating fluid, a casing secured to said valve casing, said valve having a hollow stem sealed from the fluid controlled by said valve, an adjustable member secured to said last named casing, a tension spring secured within said stem and to said member to open the valve, a thermosensitive device associated with said casings, and means including a lever connecting said device with said stem for causing closing movements of the valve by said device.

2. In valve mechanism of the character described, the combination of a valve casing, a valve in said casing controlling the supply of heating medium and having a stem sealed from the fluid controlled by the valve, an expansion chamber carried by the casing including an expansible wall and end plates, a ventilated casing in which said expansion chamber is mounted, means exterior of said casing for moving one of said end plates to limit their movement relative to each other, means, operatively connecting the other end plate with said valve for closing the same, and adjustable spring means for opening said valve.

3. In valve mechanism of the type described, the combination of a valve casing, a valve in said casing controlling the supply of heating fluid, a tubular stem for said valve, a flexible walled diaphragm surrounding said stem and connected to said valve and casing, a casing secured to said valve casing and provided with an opening alined with said valve, a threaded sleeve slidably mounted in said opening, a tension spring respectively secured at its ends in said tubular stem and said threaded sleeve, a tension-adjusting nut on said sleeve, a bell-crank lever pivotally mounted in said casing and connected at one end to said stem, a laterally extending, ventilated casing associated with said casings, a thermosensitive device mounted in said last named casing and connected to the other end of said lever, and manually operable means for moving parts of said device relative to each other to operate said lever to close the valve, said last named means also serving to limit the lift of said valve.

In testimony whereof, I affix my signature.

FREDERICK W. JAEGER.